United States Patent [19]

Shibayama

[11] Patent Number: 5,557,470
[45] Date of Patent: Sep. 17, 1996

[54] ZOOM LENS SYSTEM

[75] Inventor: Atsushi Shibayama, Kawasaki, Japan

[73] Assignee: Nikon Corporation, Tokyo, Japan

[21] Appl. No.: 243,409

[22] Filed: May 16, 1994

[30] Foreign Application Priority Data

May 27, 1993 [JP] Japan .................................. 5-124558

[51] Int. Cl.⁶ .................................................. G02B 15/14
[52] U.S. Cl. ........................................ 359/687; 359/708
[58] Field of Search ................................. 359/687, 708, 359/686

[56] References Cited

U.S. PATENT DOCUMENTS 5,000,551  3/1991  Shibayama .............................. 350/427

FOREIGN PATENT DOCUMENTS

1-239516  9/1989  Japan .
4-309913  11/1992  Japan .

Primary Examiner—Georgia Y. Epps
Assistant Examiner—Dawn-Marie Bey
Attorney, Agent, or Firm—Shapiro and Shapiro

[57] ABSTRACT

A zoom lens system includes a first lens group having a positive refracting power, a second lens group having a negative refracting power, a third lens group having a positive refracting power and a fourth lens group having a positive refracting power. These lens groups are arranged in this order as viewed from an object. During zooming operation from the wide angle end to the telephoto end of the zoom lens system, the air space between the first and second lens groups increases and the air space between the third and fourth lens groups decreases. A focal length equal to the diagonal line of the effective image plane of the zoom lens system is included in the zooming range of the zoom lens system. The zoom lens system is formed so as to satisfy various conditions for making the zoom lens system small and giving a high zoom ratio.

46 Claims, 3 Drawing Sheets

ZOOM LENS SYSTEM

BACKGROUND OF THE INVENTION

1. Field of the Invention

The present invention relates to a zoom lens system and more particularly to a standard zoom lens system of a small size suited for a single-lens reflex camera.

2. Related Background Art

Recently various kinds of zoom lens systems have been proposed which have a small size and a high magnification. In the field of the so-called standard zoom lens system having a focal length substantially equal to the length of the diagonal line of the image plane, such zoom lens systems have been proposed as (1) a two-lens groups zoom lens system consisting of a negative lens group and a positive lens group, (2) a four-groups zoom lens system consisting of a positive lens group, a negative lens group, another positive lens group and another negative lens group and (3) another four groups zoom lens system consisting of a positive lens group, a negative lens group, another positive lens group and a further positive lens group.

The two-groups zoom lens system (1) (consisting of a negative lens group and a positive lens group) is small and is composed of a small number of component lenses. Its assembling tolerances are relatively large and it can be manufactured at a low cost. Thus, it has been widely used. Most conventional zoom lens systems each have a zoom ratio of around 2. However, the zoom ratio has recently become higher and higher, and a zoom lens system having a zoom ratio of around 2.5 is proposed, for example, in Japanese Laid-open Patent Application No. 1-239516.

The last lens group of the zoom lens system (2) (consisting of a positive lens group, a negative lens group, another positive lens group and another negative lens group) is a negative lens group. Thus, the zoom lens system (2) provides a telephoto-type power arrangement which is suited for miniaturization. A zoom lens system of this type which has a small size and provides a high zoom ratio is proposed, for example, by Japanese Laid-open Patent Application No. 4-309913.

In the zoom lens system (3) (consisting of a positive lens group, a negative lens group, another positive lens group and a further lens group), the distance between the third lens group of a positive power and the fourth lens group of a positive power can be changed in a floating way during the zooming operation so as to suppress variations of aberrations during the zooming operation. Thus, this system is suited for a high zoom ratio. A zoom lens system of this type which is small and has a high zoom ratio is proposed, for example, by U.S. Pat. No. 5,000,551.

When the zoom ratio exceeds 2.5, however, it is difficult to correct aberrations in a normal two-groups zoom lens system (1) (consisting of a negative lens group and a positive lens group). In order to provide such a high zoom ratio, the two-groups zoom lens system requires a large number of component lenses and/or a large construction. The power of each lens group must be large to miniaturize the two-groups lens system and to give it a high zoom ratio. Thus, assembly tolerances are likely to be strict.

As long as aberration corrections are concerned, the four-groups zoom lens system (2) consisting of a positive zoom lens group, a negative lens group, another positive lens group and another negative lens group is similar to a three-groups zoom lens system consisting of a positive lens group, a negative lens group and another positive lens group. Thus, the four-groups zoom lens group (2) has difficulty in suppressing variations of aberrations, particularly variation of curvature of field.

The four-groups zoom lens system (3) (consisting of a positive lens group, a negative lens group, another positive lens group and a further positive lens group) provides a high zoom ratio and a high efficiency. When, however, there occurs displacement (shift decentering) and/or inclination (tilt decentering) of the optical axes of the third and fourth lens groups, image sharpness is likely to be much deteriorated. In order to avoid such deterioration, the assembly tolerances between the third and fourth lens groups are apt to be strict, making it difficult to reduce the manufacturing cost.

SUMMARY OF THE INVENTION

The object of the present invention is to provide a small-sized standard zoom lens system which is of a four-groups zoom lens system of the type (3) comprising a positive lens group, a negative lens group, another positive lens group and a further positive lens group, which can have a high zoom ratio and a high efficiency and which has a loose assembly tolerances thereby reducing the manufacturing cost.

One aspect of the present invention is to provide a zoom lens system which comprises a first lens group having a positive refracting power, a second lens group having a negative refracting power, a third lens group having a positive refracting power and a fourth lens group having a positive refracting power, the first to fourth lens groups being arranged in this order as viewed from an object, a first air space provided between the first and second lens groups which first air space is made to increase during zooming operation effected by zooming the zoom lens system from a wide angle end to a telephoto end, a second air space provided between the second and third lens groups which second air space is made to decrease during the zooming operation, and a focal length included in a zooming range and being equal to a length of a diagonal line of an effective image plane, the zoom lens system being constructed to satisfy the following conditions:

$$1.5 < F1/FW < 2.2; \qquad (1)$$

$$0.65 < F3/F4 < 1.50; \qquad (2)$$

and $$0.04 < (e3W - e3T)/FW < 0.14, \qquad (3)$$

where:

FW is a focal length of the zoom lens system at the wide angle end;

F1 is a focal length of the first lens group;

F3 is a focal length of the third lens group;

F4 is a focal length of the fourth lens group;

e3W is an air space between the third and fourth lens groups at the wide angle end; and e3T is an air space between the third and fourth lens groups at the telephoto end.

The third lens group comprises a positive lens and a negative lens cemented thereto and arranged in this order as viewed from an object. The third lens group is constructed so as to satisfy the condition:

$$-0.5 < ra/rb < -6.0, \quad (4)$$

where:

ra is the radius of curvature of the lens of the third lens group which is the closest to the object; and rb is the radius of curvature of the lens of the third lens group which is the closest to an image.

Focusing from a long distance object to a short distance object is carried out by moving the second lens group toward the object.

Another aspect of the present invention is to provide a zoom lens system which comprises a first lens group having a positive refracting power, a second lens group having a negative refracting power, a third lens group having a positive refracting power and a fourth lens group having a positive refracting power, the first to fourth lens groups being arranged in this order as viewed from an object, a first air space provided between the first and second lens groups which first air space is made to increase during zooming operation effected by zooming the zoom lens system from a wide angle end to a telephoto end, a second air gap between the second and third lens groups which second air space is made to decrease during the zooming operation, a third air space between the third and fourth lens groups which is variable, and a focal length included in a zooming range and being equal to a length of a diagonal line of an effective image plane, wherein the third lens system consists of a positive lens and a negative lens cemented thereto and the zoom lens system satisfies the following conditions:

$$n3N - n3P > 0.10; \quad (5)$$

and $$v3P - v3N > 10, \quad (6)$$

where:

n3P is the refractive index of the positive lens;

v3P is the Abbe's number of the positive lens;

n3N is the refractive index of the negative lens; and v3N is the Abbe's number of the negative lens.

The third lens group consists of a double-convex positive lens and a negative meniscus lens directed to the object cemented thereto the positive lens and the meniscus lens being arranged in this order as viewed from the object and is made to satisfy the condition:

$$-1.0 < r3C/F3 < -0.1, \quad (7)$$

where r3C is the radius of curvature of the cemented surface of both lenses, and F3 is the focal length of the third lens group.

It is preferred that the air space between the third lens group and the fourth lens group at the wide angle end be larger than the air space between the third lens group and the fourth lens group at the telephoto end.

A zoom lens system according to the present invention comprises four-groups consisting of a positive lens group, a negative lens group, another positive lens group and a further positive lens group and provides a high zoom ratio and a high efficiency.

The conditions which the present invention is to satisfy will be described.

Condition (1) defines the ratio of the focal length F1 of the first tens group to the focal length FW of the zoom lens system at the wide angle end so as to make the zoom lens system small and to provide it with a high zoom ratio. When the value of F1/FW exceeds the upper limit of condition (1), the refracting power of the first lens group becomes relatively small. Thus, the principal point of the overall zoom lens system is moved toward an image with respect to the first lens group, resulting in unfavorable increase of the whole length of the zoom lens system. On the other hand, when the F1/FW exceeds the lower limit, the back focus of the first lens group itself is likely to become very short. Thus, the range covered by the air space between the first and second lens groups becomes unfavorably too short for the zoom lens system to provide a high zoom ratio.

Condition (2) defines the ratio of the focal length F3 of the third lens group to the focal length F4 of the fourth lens group so as to make the zoom lens system small and to make large the assembly tolerances of the third and fourth lens groups. When the F3/F4 exceeds the upper limit of condition (2), the refracting power of the fourth lens group becomes large compared with that of the third lens group and the compound principal point of the combination of the third and fourth lens groups approaches the fourth lens group. Further, because the positive refracting power of the fourth lens group becomes large, the back focus is likely to become large excessively. Thus, the whole length of the zoom lens system becomes large. This is not preferable. On the other hand, when F3/F4 exceeds the lower limit of condition (2), the refracting power of the third lens group becomes large as compared with that of the fourth lens group. Thus, it becomes difficult to correct aberrations, particularly spherical aberration and coma only by the third lens group. As a result, an aberration correcting mechanism must be formed in which the aberrations occurring in the third lens system is canceled out in the fourth lens group. In such an aberration correcting mechanism, the assembly tolerances concerning the relative positions between the third and fourth lens groups becomes strict. Thus, the inner and outer diameters of the lens chambers of the third and fourth lens groups and the zooming cam cylinder require high machining accuracies. This unfavorably raises the cost. If aberrations are intended to be corrected only by increasing the number of the component lenses of the third lens group, the whole thickness of the third lens group becomes large, and the overall length of the zoom lens system becomes large in order to maintain the air space between the second and third lens groups and the air space between the third and fourth lens groups. This is not preferable, either.

Condition (3) provides a good image characteristic in which variations of aberrations, particularly curvature of field and distortion produced during zooming operation are made small under the refracting powers defined by conditions (1) and (2). When (e3W−e3T)/FW exceeds the upper limit of condition (3), the air space between the third and fourth lens groups at the wide angle end becomes large, and the total length of the zoom lens system at the wide angle end and the lens diameter of the fourth lens group are made large. This is not preferable. On the other hand, when (e3W−e3T)/FW exceeds the lower limit, the change of the air space between the third and fourth lens groups is made small. Full floating effect during the zooming operation cannot be attained and it becomes difficult to make the zooming variations of aberrations small. In particular, large negative distortion exists at the wide angle end and large positive distortion exists at the telephoto end. Thus, the correction becomes difficult.

It is preferred that the third lens group comprise a positive lens and a negative lens cemented thereto in order to correct chromatic aberration and simplify the structure and assembling process of the lens chamber of the third lens group as well. It is also preferred that the third lens group comprise a double-convex positive lens and a negative meniscus lens cemented thereto with the concave surface directed to an object arranged in this order as viewed from the object to correct spherical aberration and coma only by the third lens group. In this case, it is preferred that condition (4) be satisfied. When ra/rb exceeds the limits of condition (4), it becomes difficult to correct spherical aberration and coma produced in the third lens group.

It is further preferred that condition (5) be satisfied to correct spherical aberration and coma produced in the third lens group. When (n3N–n3P) becomes smaller than 0.10, variations of the spherical aberration and coma become large, which is not preferable.

It is still further preferred that condition (6) be satisfied to suppress variation of chromatic aberration during zooming operation. When (v3P–v3N) becomes smaller than 10, variations of axial chromatic aberration and chromatic aberration of magnification become large, which is not preferable, either.

It is preferred that condition (7) as well as conditions (5) and (6) be satisfied in order to correct spherical aberration, coma and chromatic aberration well and to make large assembling tolerances of the third and fourth lens groups. When r3C/F3 exceeds the upper and lower limits, it becomes difficult to correct spherical aberration, coma and chromatic aberration at the same time and the variations of these aberrations during the zooming operation increase. Unfavorable high assembling accuracies are needed to reduce the aberrations.

It is preferred that the focal length of the third lens group be within the range defined by the condition:

$$0.8 < F3/FW < 3.0 \qquad (8)$$

When F3/FW exceeds the lower limit, the refracting power of the third lens group becomes excessive. It becomes difficult to correct the aberrations of the third lens group consisting of a positive lens and a negative lens, and the assembling accuracies of the third and fourth lens groups become unfavorably strict. On the other hand, when F3/FW exceeds the upper limit, the total length of the zoom lens system becomes unfavorably long.

Further it is preferred to satisfy condition:

$$-1.00 < F2/FW < -0.25 \qquad (9)$$

where F2 is the focal length of the second lens group.

When F2/FW exceeds the upper limit of condition (9), the refracting power of the second lens group becomes excessive, and it becomes difficult to correct the aberrations. This is not preferable. On the other hand, when F2/FW exceeds the lower limit of condition (9), the refracting power of the second lens group becomes small. The zoom ratio is lowered and the total length of the zoom lens system becomes long. This is not preferable, either.

It is preferred that the so-called inner focusing or rear focusing which is carried out by moving the second lens group or the following lens groups be selected rather than the so-called front focusing which is carried out by moving the first lens group along the optical axis of the zoom lens system in order to make the lens diameters of the first lens group small.

In particular, however, it is preferred in the zoom lens system according to the embodiment of the present invention that focusing from a long distance object to a short distance object be carried out by moving the second lens group toward the object so that the focusing movement is made small.

DESCRIPTION OF THE PREFERRED EMBODIMENTS

The present invention will be described by way of preferred embodiments with reference to the accompanying drawings.

First Embodiment

Figure 1:
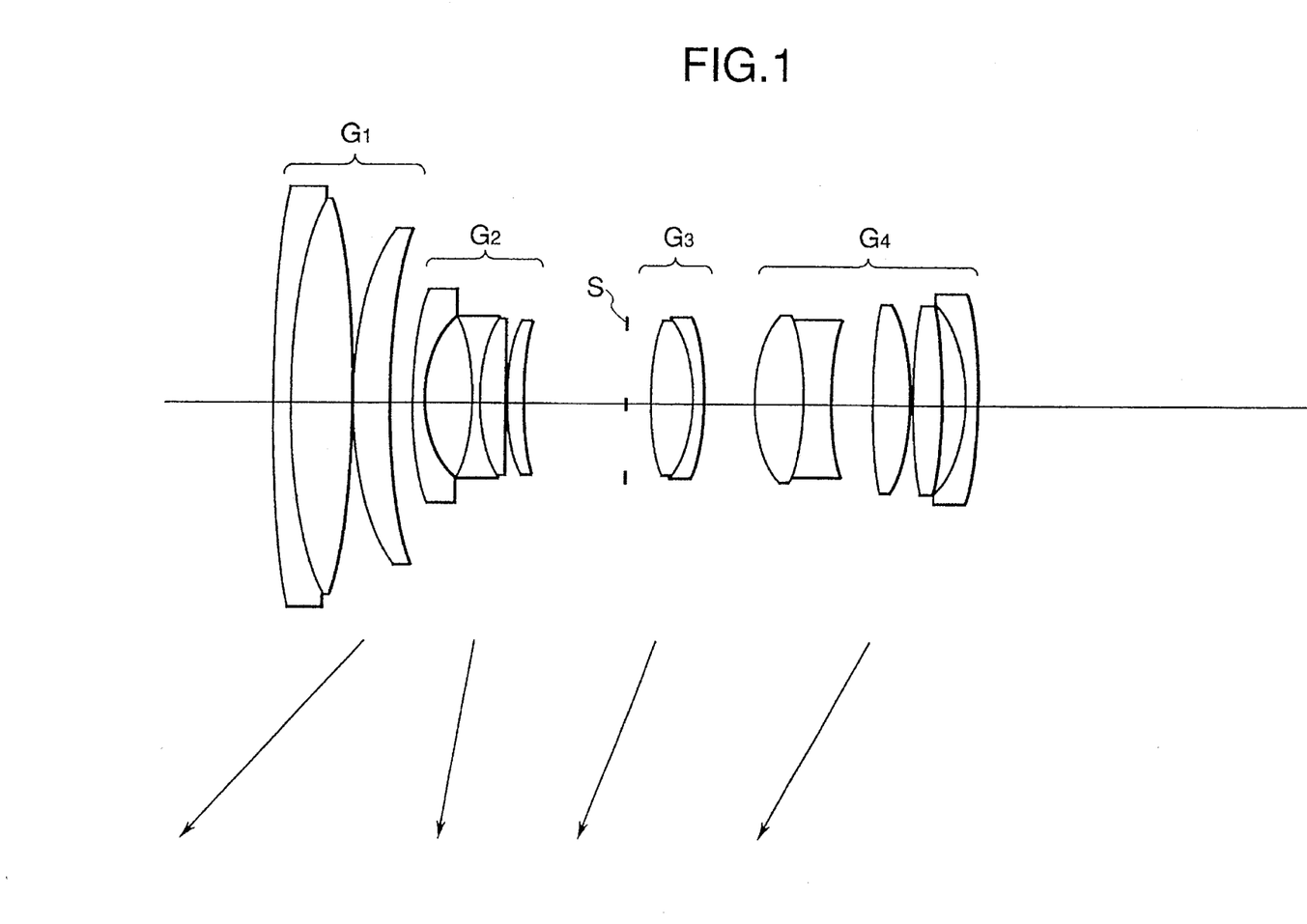
FIG. 1 shows a lens structure of a first embodiment of the present invention.

FIG. 1 shows the lens structure of a zoom lens system according to a first embodiment of the present invention. The zoom lens system comprises a first lens group G1 having a positive refracting power as a whole, a second lens group G2 having a negative refracting power as a whole, a third lens group G3 having a positive power as a whole, and a fourth lens group G4 having a positive lens as a whole. The first to fourth lens groups are arranged in this order as viewed from an object. The first lens group G1 comprises a cemented lens composed of a negative meniscus lens having a convex surface directed to the object and a double-convex lens cemented to the meniscus lens, and a positive meniscus lens having a convex surface directed to the object. The second lens group G2 comprises a negative meniscus lens having a convex surface directed to the object, a cemented negative lens composed of a double-concave lens and a positive meniscus lens having a convex surface directed to the object cemented thereto, and a positive meniscus lens having a convex surface directed to the object. The third lens group G3 comprises a stop S and a cemented positive lens composed of a double-convex lens and a negative meniscus lens having a concave surface directed to the object. The fourth lens group G4 comprises a cemented lens composed of a double-convex lens and a double-concave lens cemented thereto, two double-convex lenses, a negative meniscus lens having a concave surface directed to the object. These component lenses are arranged in this order as viewed from the object.

The lens surface of the lens of the second lens group G2 which is the closest to the object is aspherical and its shape is given by:

$$X(y) = y^2/[r \cdot \{1 + (1 - k \cdot y^2/r^2)^{1/2}\}] + C2 \cdot y^2 + C4 \cdot y^4 + C6 \cdot y^6 + C8 \cdot y^8 + C10 \cdot y^{10}$$

where $X(y)$ is the respective axial distance from a contact plane on the vertex of the aspherical surface of the lens to the aspherical surface at a height y, r is the radius of curvature of a paraxial part, k is a conic constant, and Ci is the aspherical coefficient of the i-th order.

Upon zooming the zoom lens system from the wide angle end to the telephoto end, the first to fourth lens groups are all moved toward the object. The air space between the first and second lens groups increases, and both the air space between the second and third lens groups and the air space between the third and fourth lens groups decrease.

The focusing from a long distance object to a short distance object is carried out by moving the second lens group toward the object.

Table 1 shows the dimensions of the first embodiment of the present invention. F is the focal length, f is the f-number and 2ω is the angle of view. The figures on the left column show the orders of the lens surfaces counted from the object side. r's are the radii of curvature of the lens surfaces, and d's are the distances between the adjacent lens surfaces. n's are refractive indexes, and v's are the Abbe's numbers of the d lines ($\lambda$=587.6 nm). The length of the diagonal line of the image plane is 43.2.

TABLE 1

F = 36.000–103.125
f = 3.59–4.60
2$\omega$ = 64.0–22.7°

| | r | d | v | n |
|---|---|---|---|---|
| 1 | 216.250 | 2.125 | 23.0 | 1.86074 |
| 2 | 70.316 | 7.500 | 64.1 | 1.51680 |
| 3 | –120.301 | .125 | | |
| 4 | 41.828 | 4.625 | 52.3 | 1.74810 |
| 5 | 97.101 | (d 5) | | |
| 6 | 42.108 | 1.500 | 57.5 | 1.67025 |
| 7 | 13.749 | 5.500 | | |
| 8 | –24.966 | 1.250 | 52.3 | 1.74810 |
| 9 | 26.588 | 2.625 | 23.0 | 1.86074 |
| 10 | 127.623 | .125 | | |
| 11 | 27.724 | 1.875 | 25.5 | 1.80458 |
| 12 | 40.214 | (d12) | | |
| 13 | 36.425 | 5.500 | 60.3 | 1.51835 |
| 14 | –16.625 | 1.250 | 33.9 | 1.80384 |
| 15 | –35.229 | (d15) | | |
| 16 | 19.626 | 6.125 | 56.5 | 1.50137 |
| 17 | –35.873 | 3.000 | 40.9 | 1.79631 |
| 18 | 41.528 | 5.125 | | |
| 19 | 97.121 | 4.875 | 50.8 | 1.65844 |
| 20 | –27.372 | .125 | | |
| 21 | –83.032 | 3.375 | 60.1 | 1.62041 |
| 22 | –83.032 | 3.250 | | |
| 23 | –17.675 | 1.250 | 40.9 | 1.79631 |
| 24 | –74.453 | (B.F) | | |

The changes of lens distances upon zooming operation are shown below.

| F | 36.0001 | 62.5002 | 103.1251 |
|---|---|---|---|
| d 5 | 2.4977 | 14.1939 | 23.5059 |
| d12 | 16.1129 | 9.4830 | 3.7588 |
| d15 | 6.1968 | 3.4099 | 1.9262 |
| B.F | 41.7760 | 51.8087 | 59.9252 |

The shapes of the aspherical surfaces of the sixth surface are shown below.

k=0.1000×10
C2=0.0000
C4=–0.2224×10$^{-5}$
C6=–0.4205×10$^{-7}$
C8=0.2705×10$^{-9}$
C10=–0.1013×10$^{-11}$

The values of the first embodiment corresponding to conditions (1) to (9) are shown below.

(1) F1/FW=1.982
(2) F3/F4=0.895
(3) (e3W–e3T)/FW=0.119
(4) ra/rb=–1.034
(5) n3N–n3P=0.28549
(6) v3P–v3N=26.4
(7) r3C/F3=–0.326
(8) F3/FW=1.416
(9) F2/FW=–0.467

It is found in the first embodiment that the aberrations are corrected well and the image property is excellent.

Second Embodiment

Figure 2:
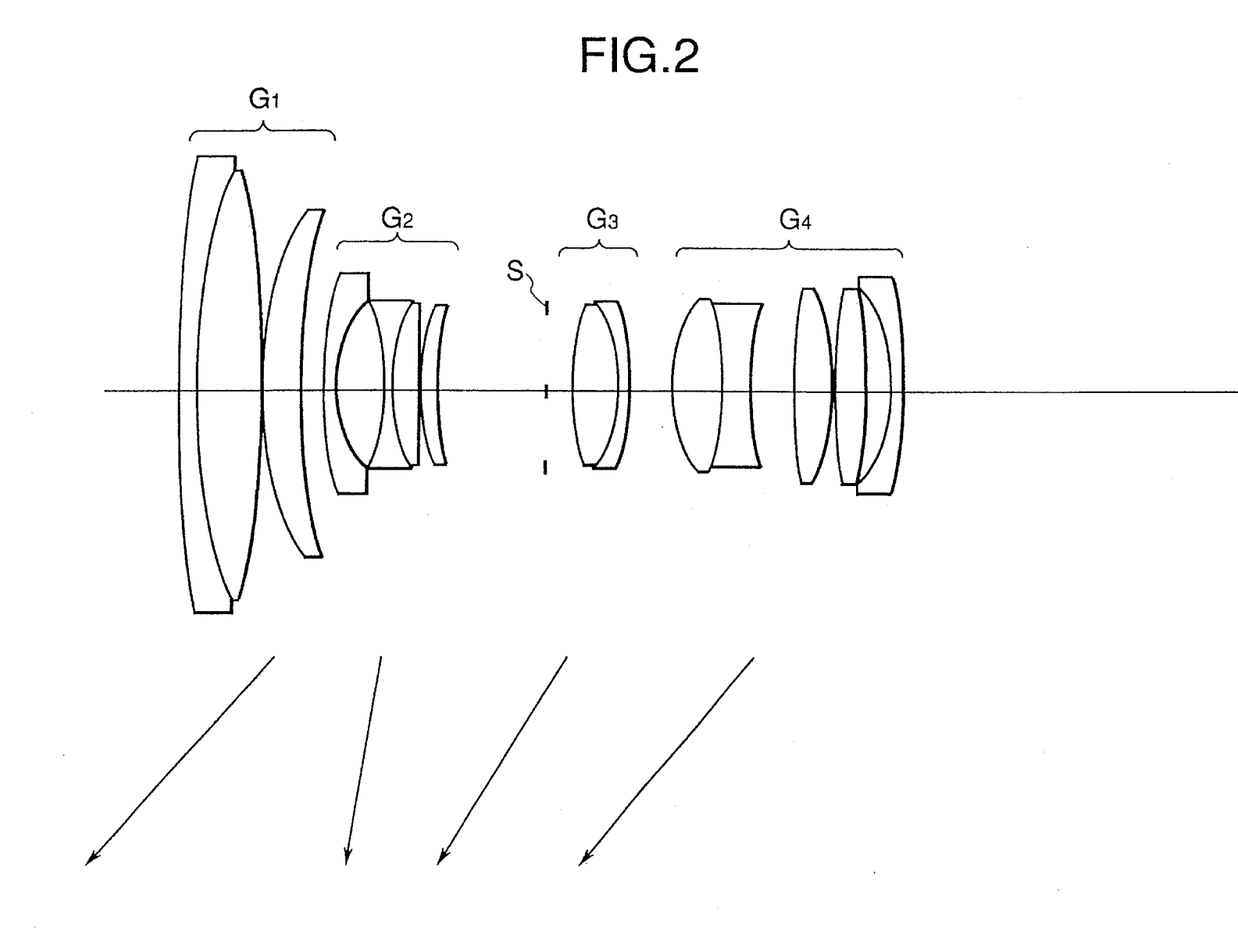
FIG. 2 shows a lens structure of a second embodiment of the present invention.

FIG. 2 shows the lens structure of a zoom lens system according to a second embodiment of the present invention. The zoom lens system comprises a first lens group G1 having a positive refracting power as a whole, a second lens group G2 having a negative refracting power as a whole, a third lens group G3 having a positive power as a whole, and a fourth lens group G4 having a positive lens as a whole. The first to fourth lens groups are arranged in this order as viewed from an object. The first lens group G1 comprises a cemented lens composed of a negative meniscus lens having a convex surface directed to an object and a double-convex lens cemented to the meniscus lens, and a positive meniscus lens having a convex surface directed to the object. The second lens group G2 comprises a negative meniscus lens having a convex surface directed to an object, a cemented negative lens composed of a double-concave lens and a positive meniscus lens having a convex surface directed to the object cemented thereto, and a positive meniscus lens having a convex surface directed to the object. The third lens group G3 comprises a stop S and a cemented positive lens composed of a double-convex lens and a negative meniscus lens having a concave surface directed to the object. The fourth lens group G4 comprises a cemented lens composed of a double-convex lens and a double-concave lens cemented to thereto, two double-convex lenses, and a negative meniscus lens having a concave surface directed to the object. These component lenses are arranged in this order as viewed from the object.

The lens surface of the lens of the second lens group which is the closest to the object is aspherical and its shape is given by:

$$X(y)=y^2/[r\cdot\{1+(1-k\cdot y^2/r^2)^{1/2}\}]+C2\cdot y^2+C4\cdot y^4+C6\cdot y^6+C8\cdot y^8+C10\cdot y^{10}$$

where X(y) is the respective axial distance from a contact plane on the vertex of the aspherical surface of the lens to the aspherical surface at a height y, r is the radius of curvature of a paraxial part, k is a conic constant, and Ci is the aspherical coefficient of the i-th order.

Upon zooming the zoom lens system from the wide angle end to the telephoto end, the first to fourth lens groups are moved toward the object. The air space between the first and second lens groups increases, and both the air space between the second and third lens groups and the air space between the third and fourth lens groups decrease.

The focusing from a long distance object to a short distance object is carried out by moving the second lens group toward the object.

Table 2 shows the dimensions of the first embodiment of the present invention. F is the focal length, f is the f-number and 2$\omega$ is the angle of view. The figures on the left column show the orders of the lens surfaces counted from the object side. r's are the radii of curvature of the lens surfaces, and d's are the distances between the adjacent lens surfaces. n's are refractive indexes, and v's are the Abbe's numbers of the d lines (v=587.6 nm). The length of the diagonal line of the image plane is 43.2.

TABLE 2

F = 36.000–103.125
f = 3.58–4.71
2$\omega$= 64.1–22.6°

| | r | d | v | n |
|---|---|---|---|---|
| 1 | 180.743 | 2.125 | 23.0 | 1.86074 |
| 2 | 66.263 | 7.500 | 64.1 | 1.51680 |

TABLE 2-continued

F = 36.000–103.125
f = 3.58–4.71
2ω = 64.1–22.6°

| | r | d | ν | n |
|---|---|---|---|---|
| 3 | −139.691 | .125 | | |
| 4 | 39.816 | 5.000 | 52.3 | 1.74810 |
| 5 | 151.380 | (d 5) | | |
| 6 | 46.679 | 1.500 | 57.5 | 1.67025 |
| 7 | 13.384 | 5.500 | | |
| 8 | −23.407 | 1.250 | 52.3 | 1.74810 |
| 9 | 29.635 | 2.625 | 23.0 | 1.86074 |
| 10 | 104.439 | .125 | | |
| 11 | 24.557 | 1.875 | 25.5 | 1.80458 |
| 12 | 33.346 | (d12) | | |
| 13 | 33.953 | 5.500 | 60.3 | 1.51835 |
| 14 | −16.461 | 1.250 | 33.9 | 1.80384 |
| 15 | −32.132 | (d15) | | |
| 16 | 20.006 | 6.125 | 56.5 | 1.50137 |
| 17 | −34.403 | 3.000 | 40.9 | 1.79631 |
| 18 | 40.594 | 5.125 | | |
| 19 | 95.867 | 4.875 | 50.8 | 1.65844 |
| 20 | −27.662 | .125 | | |
| 21 | 95.737 | 3.375 | 60.1 | 1.62041 |
| 22 | −95.737 | 3.250 | | |
| 23 | −17.655 | 1.250 | 45.4 | 1.79668 |
| 24 | −61.763 | (B.F) | | |

The changes of lens distances upon zooming operation are shown below.

| F | 36.0001 | 62.5000 | 103.1247 |
|---|---|---|---|
| d 5 | 2.5903 | 10.5946 | 17.3498 |
| d12 | 16.0884 | 9.5081 | 3.9342 |
| d15 | 4.4408 | 3.5345 | 2.7827 |
| B.F | 40.7956 | 52.3835 | 61.9974 |

The shapes of the aspherical surfaces of the sixth surface are shown below.

k=0.1000×10
C2=0.0000
C4=−0.5166×10$^{-5}$
C6=−0.4812×10$^{-7}$
C8=0.2537×10$^{-9}$
C10=−0.9320×10$^{-12}$

The values of the second embodiment corresponding to conditions (1) to (9) are shown below.

(1) F1/FW=1.597
(2) F3/F4=0.697
(3) (e3W−e3T)/FW=0.046
(4) ra/rb=−1.057
(5) n3N−n3P=0.28549
(6) ν3P−ν3N=26.4
(7) r3C/F3=−0.371
(8) F3/FW=1.232
(9) F2/FW=−0.406

It is found in the second embodiment that the aberrations are corrected well and the image property is excellent.

Third Embodiment

Figure 3:
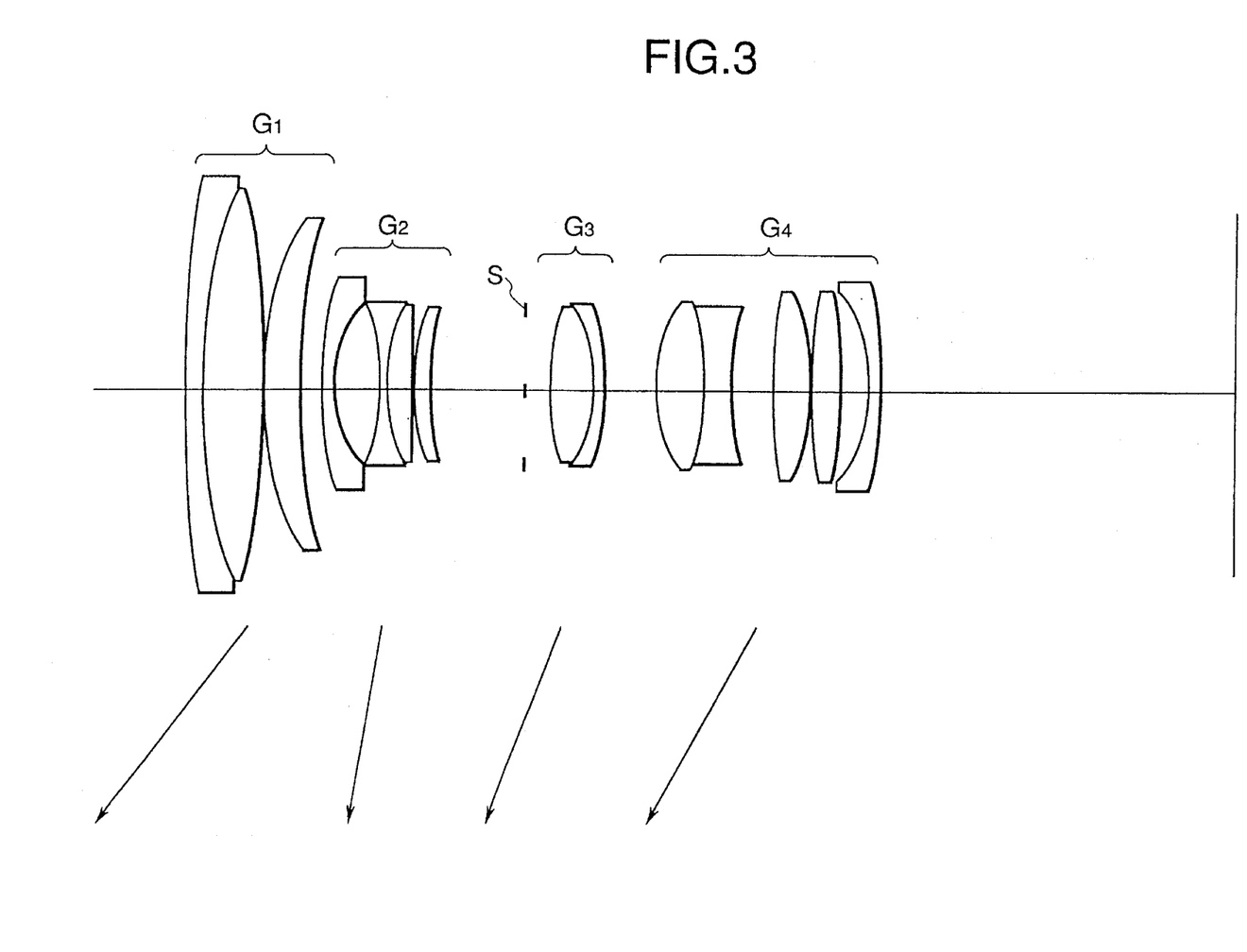
FIG. 3 shows a lens structure of a third embodiment of the present invention.

FIG. 3 shows the lens structure of a zoom lens system according to a third embodiment of the present invention. The zoom lens system comprises a first lens group G1 having a positive refracting power as a whole, a second lens group G2 having a negative refracting power as a whole, a third lens group G3 having a positive power as a whole, and a fourth lens group G4 having a positive lens as a whole. The first to fourth lens groups are arranged in this order as viewed from an object. The first lens group G1 comprises a cemented lens composed of a negative meniscus lens having a convex surface directed to the object, and a double-convex lens cemented to the meniscus lens, and a positive meniscus lens having a convex surface directed to the object. The second lens group G2 comprises a negative meniscus lens having a convex surface directed to the object, a cemented negative lens composed of a double-concave lens and a positive meniscus lens having a convex surface directed to the object cemented thereto, and a positive meniscus lens having a convex surface directed to the object. The third lens group G3 comprises a stop S and a cemented positive lens composed of a double-convex lens and a negative meniscus lens having a concave surface directed to the object. The fourth lens group G4 comprises a cemented lens composed of a double-convex lens and a double-concave lens cemented thereto, two double-convex lenses, a negative meniscus lens having a concave surface directed to the object. These component lenses are arranged in this order as viewed from the object.

The lens surface of the lens of the second lens group which is the closest to the object is aspherical and its shape is given by:

$$X(y)=y^2/[r \cdot \{1+(1-k \cdot y^2/r^2)^{1/2}\}]+C2 \cdot y^4+C4 \cdot y^4+C6 \cdot y^6+C8 \cdot y^8+C10 \cdot y^{10}$$

where $X(y)$ is the respective axial distance from a contact plane on the vertex of the aspherical surface of the lens to the aspherical surface at a height y, r is the radius of curvature of a paraxial part, k is a conic constant, and Ci is the aspherical coefficient of the i-th order.

Upon zooming the zoom lens system from the wide angle end to the telephoto end, the first to fourth lens groups are moved toward the object. The air space between the first and second lens groups increases, and both the air space between the second and third lens groups and the air space between the third and fourth lens groups decrease.

The focusing from a long distance object to a short distance object is carried out by moving the second lens group toward the object.

Table 3 shows the dimensions of the third embodiment of the present invention. F is the focal length, f is the f-number and 2ω is the angle of view. The figures on the left column show the orders of the lens surfaces counted from the object side. r's are the radii of curvature of the lens surfaces, and d's are the distances between the adjacent lens surfaces. n's are refractive indexes, and ν's are the Abbe's numbers of the d lines (λ=587.6 nm). The length of the diagonal line of the image plane is 43.2.

TABLE 3

F = 36.000–103.125
f = 3.61–5.09
2ω = 64.1–22.7°

| | r | d | ν | n |
|---|---|---|---|---|
| 1 | 131.116 | 2.125 | 23.0 | 1.86074 |
| 2 | 54.340 | 8.750 | 59.0 | 1.51823 |
| 3 | −120.729 | .125 | | |
| 4 | 47.605 | 4.625 | 49.4 | 1.77279 |
| 5 | 97.625 | (d 5) | | |
| 6 | 54.092 | 1.500 | 52.3 | 1.74810 |
| 7 | 15.608 | 5.500 | | |
| 8 | −21.638 | 1.250 | 52.3 | 1.74810 |
| 9 | 33.928 | 2.625 | 23.0 | 1.86074 |
| 10 | −1704.216 | .125 | | |
| 11 | 37.849 | 1.875 | 25.5 | 1.80458 |

TABLE 3-continued

F = 36.000–103.125
f = 3.61–5.09
2ω = 64.1–22.7°

| | r | d | v | n |
|---|---|---|---|---|
| 12 | 65.208 | (d12) | | |
| 13 | 63.467 | 5.500 | 60.0 | 1.64000 |
| 14 | –14.767 | 1.250 | 46.5 | 1.80411 |
| 15 | –48.912 | (d15) | | |
| 16 | 18.342 | 6.125 | 56.5 | 1.50137 |
| 17 | –36.610 | 3.000 | 40.9 | 1.79631 |
| 18 | 48.315 | 5.125 | | |
| 19 | 102.009 | 4.875 | 50.8 | 1.65844 |
| 20 | –30.372 | .125 | | |
| 21 | 98.869 | 3.375 | 60.1 | 1.62041 |
| 22 | –48.085 | 3.250 | | |
| 23 | –16.963 | 1.250 | 33.9 | 1.80384 |
| 24 | –75.942 | (B.F) | | |

The changes of lens distances upon zooming operation are shown below.

| F | 36.0000 | 62.5001 | 103.1251 |
|---|---|---|---|
| d 5 | 2.3535 | 13.2695 | 22.6872 |
| d12 | 15.2403 | 8.3932 | 3.3461 |
| d15 | 5.8628 | 3.8932 | 1.3337 |
| B.F | 44.2507 | 56.7765 | 67.5832 |

The shapes of the aspherical surfaces of the sixth surface are shown below.

k=0.1000×10

C2=0.0000

C4=0.9076×10$^{-6}$

C6=–0.3311×10$^{-7}$

C8=0.1608×10$^{-9}$

C10=–0.3345×10$^{-12}$

The values of the first embodiment corresponding to conditions (1) to (9) are shown below.

(1) F1/FW=2.101

(2) F3/F4=1.400

(3) (e3W–e3T)/FW=0.126

(4) ra/rb=–1.280

(5) n3N–n3P=0.16411

(6) v3P–v3N=13.5

(7) r3C/F3=–0.225

(8) F3/FW=1.823

(9) F2/FW=–0.479

It is found in the third embodiment that the aberrations are corrected well and the image property is excellent.

As described above, the present invention provides a standard zoom lens system of a small size which is suited for a single-lens reflex camera, has a high zooming ratio and is easy to assemble.

Focusing of the embodiments of the present invention is most suitably carried out by moving the second lens group toward the object, but can be performed by:

(1) moving the first lens group toward the object;

(2) moving both the first and second lens groups as a body toward the object;

(3) moving both the first and second lens groups toward the object with the distance therebetween varied;

(4) moving both the third and fourth groups as a body toward the image;

(5) moving both the third and fourth groups toward the image with the distance therebetween varied; or (6) moving the second, third and fourth lens groups with the distances therebetween varied.

The image can be finely adjusted in a plane perpendicular to the optical axis of the zoom lens system by moving any one of the first to fourth lens groups or the third and fourth lens groups as a body perpendicularly to the optical axis. The zoom lens system provided with this image adjusting means can be applicable to an antivibration lens system by combining a lens driving device, an vibration detecting device and the like with the image adjusting means.

What is claimed is:

1. A zoom lens system having a wide angle end, a telephoto end, a zoom range and an effective image plane with a diagonal line and comprising:

a first lens group having a positive refracting power;

a second lens group having a negative refracting power;

a third lens group having a positive refracting power, and consisting of a positive lens and a negative lens cemented thereto;

a fourth lens group having a positive refracting power;

said first to fourth lens groups being arranged in this order as viewed from an object;

a first air space provided between said first and second lens groups and increasing during zooming operation from said wide angle end to said telephoto end;

a second air space provided between said second and third lens groups and decreasing during said zooming operation; and a focal length included in said zooming range and being equal to a length of said diagonal line of said effective image plane;

said zoom lens system satisfying the following conditions:

$1.5 < F1/FW < 2.2;$ $0.65 < F3/F4 < 1.50;$ and $0.04 < (e3W - e3T)/FW < 0.14,$ where:

FW is a focal length of said zoom lens system at said wide angle end;

F1 is a focal length of said first lens group;

F3 is a focal length of said third lens group;

F4 is a focal length of said fourth lens group;

e3W is an air space between said third and fourth lens groups at said wide angle end; and e3T is an air space between said third and fourth lens groups at said telephoto end.

2. A zoom lens system according to claim 1, further satisfying a condition:

$-0.5 < ra/rb < -6.0,$ where ra is a radius of curvature of a lens surface of said third lens group which is the closest to said object, and rb is a radius of curvature of a lens surface of said third lens group which is the closest to an image.

3. A zoom lens system according to claim 1, further satisfying a condition:

$n3N - n3P > 0.10,$ where n3P is a refracting index of said positive lens of said third lens group, and n3N is a refracting index of said negative lens of said third lens group.

4. A zoom lens system according to claim 1, further satisfying a condition:

v3P−v3N>10, where v3P is an Abbe's number of said positive lens of said third lens group, and v3N is an Abbe's number of said negative lens of said third lens group.

5. A zoom lens system according to claim 1, further satisfying a condition:

−1.0<r3C/F3<−0.1, where r3C is a radius of curvature of a cemented surface of said positive lens and said negative lens of said third lens group.

6. A zoom lens system according to claim 1, further satisfying the following conditions:

0.8<F3/FW<3.0;

and

−1.00<F2/FW<−0.25;

where F2 is a focal length of said second lens group.

7. A zoom lens system according to claim 1, wherein focusing from a long distance to a short distance is carried out by moving said second lens group toward said object.

8. A zoom lens system according to claim 1, wherein at least one of said lens groups is moved perpendicularly to an optical axis of said zoom lens system, for correcting displacement of an image.

9. A zoom lens system according to claim 8, wherein said first lens group is moved perpendicularly to an optical axis of said zoom lens system, for correcting displacement of an image.

10. A zoom lens system according to claim 8, wherein said second lens group is moved perpendicularly to an optical axis of said zoom lens system, for correcting displacement of an image.

11. A zoom lens system according to claim 8, wherein said third lens group is moved perpendicularly to an optical axis of said zoom lens system, for correcting displacement of an image.

12. A zoom lens system according to claim 8, wherein said fourth lens group is moved perpendicularly to an optical axis of said zoom lens system, for correcting displacement of an image.

13. A zoom lens system according to claim 8, wherein said third lens group and said fourth lens group are moved as a body perpendicularly to an optical axis of said zoom lens system, for correcting displacement of an image.

14. A zoom lens system according to claim 1, further satisfying a condition:

0.8<F3/FW<3.0.

15. A zoom lens system according to claim 1, further satisfying a condition:

−1.00<F2/FW<−0.25, where F2 is a focal length of said second lens group.

16. A zoom lens system having a wide angle end, a telephoto end, a zoom range and an effective image plane with a diagonal line and comprising:

a first lens group having a positive refracting power;

a second lens group having a negative refracting power;

a third lens group having a positive refracting power;

a fourth lens group having a positive refracting power;

said first to fourth lens groups being arranged in this order as viewed from an object;

said third lens group comprising a positive lens and a negative lens arranged in this order as viewed from said object, said positive lens and said negative lens being cemented together;

a first air space provided between said first and second lens groups and increasing during zooming operation from said wide angle end to said telephoto end;

a second air space provided between said second and third lens groups and decreasing during said zooming operation; and a focal length included in said zooming range and being equal to a length of said diagonal line of said effective image plane;

said zoom lens system satisfying the following conditions:

1.5<F1/FW<2.2;

0.65<F3/F4<1.50;

0.04<(e3W−e3T)/FW<0.14;

and

−0.5<ra/rb<−6.0, where:
FW is a focal length of said zoom lens system at said wide angle end;
F1 is a focal length of said first lens group;
F3 is a focal length of said third lens group;
F4 is a focal length of said fourth lens group;
e3W is an air space between said third and fourth lens groups at said wide angle end;
e3T is an air space between said third and fourth lens groups at said telephoto end;
ra is a radius of curvature of a lens surface of said third lens group which is the closest to said object; and
rb is a radius of curvature of a lens surface of said third lens group which is the closest to an image.

17. A zoom lens system according to claim 16, further satisfying a condition:

−1.0<r3C/F3<−0.1, where r3C is a radius of curvature of a cemented surface of said positive lens and said negative lens of said third lens group.

18. A zoom lens system according to claim 17, further satisfying a condition:

n3N−n3P>0.10, where n3P is a refracting index of said positive lens of said third lens group, and n3N is a refracting index of said negative lens of said third lens group.

19. A zoom lens system according to claim 18, further satisfying a condition:

v3P−v3N>10, where ν3P is an Abbe's number of said positive lens of said third lens group, and ν3N is an Abbe's number of said negative lens of said third lens group.

20. A zoom lens system according to claim 19, further satisfying a condition:

$0.8<F3/FW<3.0.$

21. A zoom lens system according to claim 20, further satisfying a condition:

$-1.00<F2/FW<-0.25,$ where F2 is a focal length of said second lens group.

22. A zoom lens system according to claim 16, wherein focusing from a long distance to a short distance is carried out by moving said second lens group toward said object.

23. A zoom lens system according to claim 16, wherein at least one of said lens groups is moved perpendicularly to an optical axis of said zoom lens system, for correcting displacement of an image.

24. A zoom lens system according to claim 23, wherein said first lens group is moved perpendicularly to an optical axis of said zoom lens system, for correcting displacement of an image.

25. A zoom lens system according to claim 23, wherein said second lens group is moved perpendicularly to an optical axis of said zoom lens system, for correcting displacement of an image.

26. A zoom lens system according to claim 23, wherein said third lens group is moved perpendicularly to an optical axis of said zoom lens system, for correcting displacement of an image.

27. A zoom lens system according to claim 23, wherein said fourth lens group is moved perpendicularly to an optical axis of said zoom lens system, for correcting displacement of an image.

28. A zoom lens system according to claim 23, wherein said third lens group and said fourth lens group are moved as a body perpendicularly to an optical axis of said zoom lens system, for correcting displacement of an image.

29. A zoom lens system having a wide angle end, a telephoto end, a zoom range and an effective image plane with a diagonal line and comprising:

a first lens group having a positive refracting power;

a second lens group having a negative refracting power;

a third lens group having a positive refracting power;

a fourth lens group having a positive refracting power;

said first to fourth lens groups being arranged in this order as viewed from an object;

a first air space provided between said first and second lens groups and increasing during zooming operation from said wide angle end to said telephoto end;

a second air space provided between said second and third lens groups and decreasing during said zooming operation;

a third air space provided between said third and fourth lens groups and varied during said zooming operation; and a focal length included in said zooming range and being equal to a length of said diagonal line of said effective image plane;

said third lens group consisting of a positive lens and a negative lens cemented thereto; and said zoom lens system satisfying the following conditions:

$n3N-n3P>0.1;$ and $v3P-v3N>10;$ where:
n3P is a refracting index of said positive lens of said third lens group;
n3N is a refracting index of said negative lens of said third lens group;
ν3P is an Abbe's number of said positive lens of said third lens group; and
ν3N is an Abbe's number of said negative lens of said third lens group;

wherein said third lens group consists of a double-convex positive lens and a negative meniscus lens cemented thereto, said double-convex positive lens and said negative meniscus lens being arranged in this order as viewed from said object, and said zoom lens system further satisfies a condition:

$-1.0<r3C/F3<-0.1,$ where r3C is a radius of curvature of a cemented surface of said double-convex positive lens and said negative meniscus lens, and F3 is a focal length of said third lens group.

30. A zoom lens system according to claim 29, wherein said third air space between said third and fourth lens groups at said wide angle end is larger than said third air space between said third and fourth lens groups at said telephoto end.

31. A zoom lens system according to claim 30, further satisfying a condition:

$-1.00<F2/FW<-0.25,$ where F2 is a focal length of said second lens group, and FW is a focal length of said zoom lens system at said wide angle end.

32. A zoom lens system according to claim 31, further satisfying a condition:

$0.8<F3/FW<3.0.$

33. A zoom lens system according to claim 32, further satisfying a condition:

$1.5<F1/FW<2.2,$ where F1 is a focal length of said first lens group.

34. A zoom lens system according to claim 33, further satisfying a condition:

$0.65<F3/F4<1.50,$ where F4 is a focal length of said fourth lens group.

35. A zoom lens system according to claim 34, further satisfying a condition:

$0.04<(e3W-e3T)/FW<0.14,$ where e3W is an air space between said third and fourth lens groups at said wide angle end, and e3T is an air space between said third and fourth lens groups at said telephoto end.

36. A zoom lens system according to claim 35, wherein focusing from a long distance to a short distance is carried out by moving said second lens group toward said object.

37. A zoom lens system according to claim 35, wherein at least one of said lens groups is moved perpendicularly to an optical axis of said zoom lens system, for correcting displacement of an image.

38. A zoom lens system according to claim 37, wherein said first lens group is moved perpendicularly to an optical axis of said zoom lens system, for correcting displacement of an image.

39. A zoom lens system according to claim 37, wherein said second lens group is moved perpendicularly to an optical axis of said zoom lens system, for correcting displacement of an image.

40. A zoom lens system according to claim 37, wherein said third lens group is moved perpendicularly to an optical axis of said zoom lens system, for correcting displacement of an image.

41. A zoom lens system according to claim 37, wherein said fourth lens group is moved perpendicularly to an optical axis of said zoom lens system, for correcting displacement of an image.

42. A zoom lens system according to claim 37, wherein said third lens group and said fourth lens group are moved as a body perpendicularly to an optical axis of said zoom lens system, for correcting displacement of an image.

43. A zoom lens system according to claim 30, further satisfying the following conditions:

$$1.5 < F1/FW < 2.2;$$

$$0.65 < F3/F4 < 1.50;$$

and $$0.04 < (e3W - e3T)/FW < 0.14,$$

where:
FW is a focal length of said zoom lens system at said wide angle end;
F1 is a focal length of said first lens group;
F3 is a focal length of said third lens group;
F4 is a focal length of said fourth lens group;
e3W is an air space between said third and fourth lens groups at said wide angle end; and
e3T is an air space between said third and fourth lens groups at said telephoto end.

44. A zoom lens system according to claim 29, further satisfying a condition:

$$-0.5 < ra/rb < -6.0,$$

where ra is a radius of curvature of a lens surface of said third lens group which is the closest to said object, and rb is a radius of curvature of a lens surface of said third lens group which is the closest to an image.

45. A zoom lens system according to claim 29, further satisfying the following conditions:

$$-1.00 < F2/FW < -0.25;$$

and $$0.8 < F3/FW < 3.0;$$

where FW is a focal length of said zoom lens at said wide angle end, and F2 is a focal length of said second lens group.

46. A zoom lens system having a wide angle end, a telephoto end, a zoom range and an effective image plane with a diagonal line and comprising:
a first lens group having a positive refracting power;
a second lens group having a negative refracting power;
a third lens group having a positive refracting power;
a fourth lens group having a positive refracting power;
said first to fourth lens groups being arranged in this order as viewed from an object;
a first air space provided between said first and second lens groups and increasing during zooming operation from said wide angle end to said telephoto end;
a second air space provided between said second and third lens groups and decreasing during said zooming operation;
a third air space provided between said third and fourth lens groups and varied during said zooming operation; and
a focal length included in said zooming range and being equal to a length of said diagonal line of said effective image plane;
said third lens group consisting of a positive lens and a negative lens cemented thereto; and
said zoom lens system satisfying the following conditions:

$$n3N - n3P > 0.1;$$

and $$v3P - v3N > 10;$$

where:
n3P is a refracting index of said positive lens of said third lens group;
n3N is a refracting index of said negative lens of said third lens group;
v3P is an Abbe's number of said positive lens of said third lens group; and
v3N is an Abbe's number of said negative lens of said third lens group;
wherein at least one of said lens groups is moved perpendicularly to an optical axis of said zoom lens system, for correcting displacement of an image, and said third lens group and said fourth lens group are moved as a body perpendicularly to an optical axis of said zoom lens system for correcting displacement of an image.

* * * * *